US010926890B2

(12) United States Patent
Ghosh

(10) Patent No.: US 10,926,890 B2
(45) Date of Patent: Feb. 23, 2021

(54) DELIVERY OF ELECTRICAL POWER TO AN UNMANNED AIRCRAFT

(71) Applicant: BRITISH TELECOMMUNICATIONS PUBLIC LIMITED COMPANY, London (GB)

(72) Inventor: Ayan Ghosh, London (GB)

(73) Assignee: British Telecommunications public limited company, London (GB)

( * ) Notice: Subject to any disclaimer, the term of this patent is extended or adjusted under 35 U.S.C. 154(b) by 0 days.

(21) Appl. No.: 15/733,155

(22) PCT Filed: Nov. 23, 2018

(86) PCT No.: PCT/EP2018/082351
§ 371 (c)(1),
(2) Date: May 29, 2020

(87) PCT Pub. No.: WO2019/105587
PCT Pub. Date: Jun. 6, 2019

(65) Prior Publication Data
US 2020/0361632 A1 Nov. 19, 2020

(30) Foreign Application Priority Data
Nov. 29, 2017 (EP) ..................... 17204491

(51) Int. Cl.
*B64F 1/36* (2017.01)
*B64C 39/02* (2006.01)
(Continued)

(52) U.S. Cl.
CPC ............ *B64F 1/364* (2013.01); *B64C 39/022* (2013.01); *B64D 27/24* (2013.01);
(Continued)

(58) Field of Classification Search
CPC . B64F 1/364; B64C 39/022; B64C 2201/122; B64C 2201/027;
(Continued)

(56) References Cited

U.S. PATENT DOCUMENTS 4,842,221 A 6/1989 Beach et al.
6,325,330 B1 12/2001 Lavan
(Continued)

FOREIGN PATENT DOCUMENTS

CN 102923314 2/2013
CN 103754373 4/2014
(Continued)

OTHER PUBLICATIONS

Application and Filing Receipt for U.S. Appl. No. 16/325,814, filed Feb. 2019, Inventor(s): Ghosh et al.
(Continued)

*Primary Examiner* — Assres H Woldemaryam
(74) *Attorney, Agent, or Firm* — Patterson Thuente Pedersen, P.A.

(57) ABSTRACT

An unmanned aircraft such as a tethered drone has an electrical power connection for receiving electrical power from a remote source, and a power delivery system for delivering electrical power to onboard applications equipment such as radio transmitters. To ensure that ground staff are not exposed to high levels of radiation from the transmitters, power is only delivered to the communications equipment after the aircraft has left the ground. A sensor associated with the aircraft's undercarriage may be used to detect when the aircraft is airborne. The applications equipment is powered from an accumulator which is only charged up from the power supply after launch. In the event of a failure of the power supply when airborne, the output of the accumulator is diverted to control propulsion and flight
(Continued)

control systems, which are normally powered directly from the power supply, to allow a controlled descent, and thus shutting off the applications equipment before the aircraft returns to proximity to personnel on the ground.

13 Claims, 3 Drawing Sheets

(51) Int. Cl.
  *B64D 27/24* (2006.01)
  *H04B 7/185* (2006.01)

(52) U.S. Cl.
  CPC .. *B64C 2201/027* (2013.01); *B64C 2201/042* (2013.01); *B64C 2201/06* (2013.01); *B64C 2201/122* (2013.01); *B64C 2201/148* (2013.01); *B64D 2221/00* (2013.01); *H04B 7/18504* (2013.01)

(58) Field of Classification Search
  CPC ........ B64C 2201/042; B64C 2201/148; B64C 2201/06; B64D 27/24; B64D 2221/00; H04B 7/18504
  See application file for complete search history.

(56) References Cited

U.S. PATENT DOCUMENTS

| | | |
|---|---|---|
| 8,068,937 B2 | 11/2011 | Eaves |
| 8,781,637 B2 | 7/2014 | Eaves |
| 9,184,795 B2 | 11/2015 | Eaves |
| 9,705,302 B1 | 7/2017 | Patten |
| 2007/0200027 A1 | 8/2007 | Johnson |
| 2009/0204268 A1 | 8/2009 | Eaves |
| 2012/0075759 A1 | 3/2012 | Eaves |
| 2012/0112008 A1 | 5/2012 | Holifield |
| 2013/0103220 A1 | 4/2013 | Eaves |
| 2013/0233964 A1* | 9/2013 | Woodworth ........... G05D 1/104 244/2 |
| 2014/0233412 A1 | 8/2014 | Mishra |
| 2015/0215001 A1 | 7/2015 | Eaves |
| 2016/0046387 A1 | 2/2016 | Frolov |
| 2016/0056621 A1 | 2/2016 | Patten |
| 2016/0111877 A1 | 4/2016 | Eaves et al. |
| 2016/0134331 A1 | 5/2016 | Eaves |
| 2016/0191142 A1 | 6/2016 | Boss |
| 2016/0286629 A1* | 9/2016 | Chen ....................... F21V 5/045 |
| 2016/0291589 A1 | 10/2016 | Ashoori |
| 2016/0318607 A1 | 11/2016 | Desai |
| 2016/0363457 A1 | 12/2016 | Jelavic et al. |
| 2017/0043872 A1* | 2/2017 | Whitaker ................. B64D 1/18 |
| 2017/0190419 A1* | 7/2017 | Hundemer ............ B64C 39/024 |
| 2017/0190444 A1* | 7/2017 | Hundemer ............ B64C 39/022 |
| 2018/0077518 A1 | 3/2018 | Nguyen et al. |

FOREIGN PATENT DOCUMENTS

| | | |
|---|---|---|
| CN | 203638106 | 6/2014 |
| CN | 105083520 | 11/2015 |
| CN | 206012962 | 3/2017 |
| GB | 201012864 | 7/2010 |
| GB | 2482340 | 2/2012 |
| KR | 20160084150 | 7/2016 |
| RU | 2000109532 | 4/2000 |
| RU | 2182544 | 5/2002 |
| WO | WO-2002001756 | 1/2002 |
| WO | WO 02/061971 | 8/2002 |
| WO | WO-2009005875 | 1/2009 |
| WO | WO 2013/013219 | 1/2013 |
| WO | WO-2014089329 | 6/2014 |
| WO | WO-2015139733 | 9/2015 |
| WO | WO-2016012055 | 1/2016 |
| WO | WO-2017218120 | 12/2017 |
| WO | WO-2018036870 | 3/2018 |

OTHER PUBLICATIONS

Chandrasekharan S., et al., "Designing and Implementing Future Aerial Communication Networks", IEEE Communications Magazine, May 2016, 9 pages.
Combined Search and Examination Report under Section 17 and 18(3) for GB Application No. 1616558.1, dated Mar. 8, 2017, 5 pages.
Extended European Search Report for Application No. 16191547.5, dated Mar. 31, 2017, 14 pages.
Extended European Search Report for Application No. EP16185219. 9, dated Dec. 31, 2016, 8 pages.
GB Search Report for corresponding GB Application No. GB1614341. 4, dated Feb. 2, 2017, 1 Page.
Great Britain Search Report Under Section 17 for Application No. GB 1614341.4, dated Feb. 2, 2017, 1 page.
He, T., et al., "VigilNet: An Integrated Sensor Network System for Energy-Efficient Surveillance," ACM Transactions on Sensor Networks, Acm, 2 Penn Plaza, Suite 701 New York NY 10121-0701 USA, vol. 2 (1), Feb. 2006, pp. 1-38.
International Preliminary Report on Patentability for Application No. PCT/EP2018/082351, dated Jun. 2, 2020, 6 pages.
International Preliminary Report on Patentability for Application No. PCT/EP2017/070689, dated Mar. 7, 2019, 8 pages.
International Preliminary Report on Patentability for Application No. PCT/EP2017/070690, dated Apr. 11, 2019, 8 pages.
International Search Report and Written Opinion for Application No. PCT/EP2017/070689, dated Oct. 11, 2017, 10 pages.
International Search Report and Written Opinion for Application No. PCT/EP2017/070690, dated Nov. 23, 2017, 14 pages.
Kolar J.W., et al., "Conceptualization and Multiobjective Optimization of the Electric System of an Airborne Wind Turbine," IEEE Journal of Emerging and Selected Topics in Power Electronics, vol. 1 (2), Jun. 2013, 31 pages.
Shao, Z., et al., "A Rapid and Reliable Disaster Emergency Mobile Communication System via Aerial Ad Hoc BS Networks", Wireless Communications, Networking and Mobile Computing (WICOM), 7th International Conference on, IEEE, Sep. 23, 2011, 4 pages.
Valcarce, A., et al., "Airborne Base Stations for Emergency and Temporary Events," In: Lecture Notes of the Institute for Computer Sciences, Social Informatics and Telecommunications Engineering, Springer, DE, vol. 123, Jun. 27, 2013, 12 pages.
Valarce, Alvaro et al., *Airborne Base Stations for Emergency and Temporary Events*, Institute for Computer Sciences, 12 pages, Jun. 27, 2012.
European Search Report, Application No. EP 16185219, dated Dec. 5, 2016, 6 pages.
International Search Report and Written Opinion, Application No. PCT/EP2018/082351, dated Jan. 31, 2019, 9 pages.
Great Britain Combined Search and Examination Report, Application No. GB1614341.4, dated Feb. 3, 2017, 4 pages.
Great Britain Examination Report, Application No. GB1719857.3, dated May 18, 2018, 5 pages.
University of York, *Designing and Implementing Future Aerial Communication Networks*, available at : http://eprints.whiterose.ac. uk/96143/ 10 pages, 2016.
European Extended Search Report, Application No. EP 17204491.9, dated Apr. 16, 2018, 7 pages.
He Tian, *VigilNet: An Integrated Sensor Network System for Energy Efficient Surveillance*, © 2005, 35 pages.
Zhenhong Shao, *A Rapid and Relaible Disaster Emergency Mobile Communication System via Aerial Ad Hoc BS Networks*, Sep. 23, 2011, 7th International Conference, IEEE, 4 pages.
International Search Report and Written Opinion, Application No. PCT/EP2017/070689, dated Oct. 11, 2017, 10 pages.
English Translation of Chinese First Office Action for 201880073406.9 dated Nov. 18, 2020, 9 Pages.

\* cited by examiner

DELIVERY OF ELECTRICAL POWER TO AN UNMANNED AIRCRAFT

PRIORITY CLAIM

The present application is a National Phase entry of PCT Application No. PCT/EP2018/082351, filed Nov. 23, 2018, which claims priority from EP Patent Application No. 17204491.9, filed Nov. 29, 2017, each of which is hereby fully incorporated herein by reference.

TECHNICAL FIELD

The present disclosure relates to the delivery of electrical power to equipment on board an unmanned aircraft.

BACKGROUND

Tethered aircraft, including both buoyant and heavier-than-air craft such as drones, are often used for observation, surveillance or communications purposes. The embodiments to be described herein are particularly intended for use as temporary platforms for communications base stations in situations in which no fixed communications infrastructure is available, either because of damage to a permanent facility or to meet a temporary requirement for extra communications capacity. Such circumstances may arise because of natural disasters or planned events attracting large numbers of people, such as sporting events passing through normally remote areas. Another application of temporary platforms is for so-called "drive tests" to identify suitable sites for future platforms or identify areas of poor coverage.

The communications facilities that can be offered by such platforms can include operation as a cellular base station, a microwave relay station or any other wireless communication system. Both the uplink and backhaul can be provided wirelessly. However, communications platforms require a power supply. If the aircraft is a heavier-than-air device, such as an unmanned "drone", power is also needed to keep it airborne. Batteries have a limited life before recharging is necessary. Collection of energy on board from external sources such as solar power is impractical because of the weight and expense of the collection equipment (e.g solar panels), and does not remove the need for batteries as the power sources are intermittent.

In order to provide coverage over a wide area a communications base station needs to transmit microwaves at power levels of the order of 10 W to 100 W (approximately 1,000 times greater than a cellular handset), and for this reason safety guidelines recommend an exclusion zone of 10 m to 15 m horizontally from a macrocell transmitter when it is in operation. (As the transmissions are concentrated in the azimuthal direction, the exclusion zone can be smaller in the vertical direction.) In order to achieve a large range, such transmitters are usually mounted at elevated locations such as on purpose-built masts or on tall buildings, with no nearby obstructions, so such an exclusion zone is relatively easy to achieve, and the only personnel who should be close to the transmitter are those authorized to maintain it, who have the means to shut it down before entering this exclusion zone.

However, if the transmitter is mounted on an unmanned aircraft, any ground crew responsible for deploying and launching the craft may be within the exclusion zone when the craft is on the ground. It is desirable, therefore, that the transmitter does not operate when the aircraft is on or close to the ground. Although it is relatively straightforward to transmit a signal to a communications system while it is in operation, instructing it to shut itself down, it is less straightforward to control a dormant system from a distance to switch to an active state. Embodiments of the present invention provide a means of achieving this which is designed to "fail safe".

Similar problems may arise in other applications. For example airborne video surveillance equipment may be required to be disabled when close to the ground in order to comply with privacy regulations.

SUMMARY

According to one aspect of the present disclosure, there is provided an unmanned aircraft (which may be a captive balloon or a tethered powered heavier-than-air craft) comprising an onboard applications equipment, an electrical power connection for receiving electrical power from a remote source, and a power delivery system for delivering electrical power to the onboard applications equipment, the power delivery system being arranged to start delivering power to the onboard applications system after the aircraft has left the ground, characterized in that wherein the power delivery system comprises an electrical accumulator, the electrical accumulator being arranged to be charged from the electrical power connection during flight, and to deliver power to the onboard applications equipment when the charge in the accumulator exceeds a predetermined threshold.

According to another aspect, there is provided a method of delivery of electrical power to applications equipment on board an unmanned aircraft, the aircraft having an electrical power connection for receiving electrical power from a remote source, comprising launching the aircraft with the applications equipment disconnected from a power delivery system, detecting that the aircraft is airborne and, delivering power from the remote source to the accumulator through the electrical power connection when the aircraft is airborne, and wherein the power delivery system is an accumulator, and the applications equipment is connected to take electrical power from the accumulator only when the accumulator has received a predetermined electrical charge.

By arranging for the electrical accumulator to be charged from the electrical power connection during flight, and to deliver power to the onboard applications equipment only when the charge in the accumulator exceeds a predetermined threshold, a built in delay is imposed after launch, whilst the accumulator charges up, before the onboard equipment will start operating.

The power delivery system may also be arranged such that the accumulator delivers electrical power to the onboard applications equipment only when power is being delivered to the aircraft through the electrical power connection. Thus in the event of a power failure, the applications equipment will not be powered by the accumulator and thus will be disabled before it returns to the ground. This also allows the accumulator to be used solely to power the flight control system to enter a controlled descent mode.

The aircraft may comprise a power distribution system for receiving electrical power from the electrical power connection and transmitting it both to the power delivery system and to a flight control system using electrical power for flight control purposes such as propulsion, directional control surfaces (rudders, etc.) or to control buoyancy. This can be arranged so that the power distribution system can power the flight control system during launch, and the power delivery system is disconnected from the onboard applications system when it is delivering power to the power distribution system. It may also be arranged to disconnect the power delivery system from the onboard applications system when the electrical power connection is not receiving power from the remote source, so that the onboard applications are disabled if the aircraft makes a forced landing as the result of a power supply failure.

Supplementary methods of determining that the aircraft is airborne may include a ground proximity sensor (using radar or similar sensors), or a sensor connected to an undercarriage component of the aircraft that detects whether the undercarriage is supporting the aircraft's weight.

In the embodiment to be described, the applications equipment is for wireless communications but embodiments of the disclosure may also be applied to any equipment which should be activated only when the aircraft is airborne.

BRIEF DESCRIPTION OF THE FIGURES

An embodiment of the disclosure will be described by way of example with reference to the drawings accompanying this specification, in which.

DETAILED DESCRIPTION OF EMBODIMENTS

Figure 1:
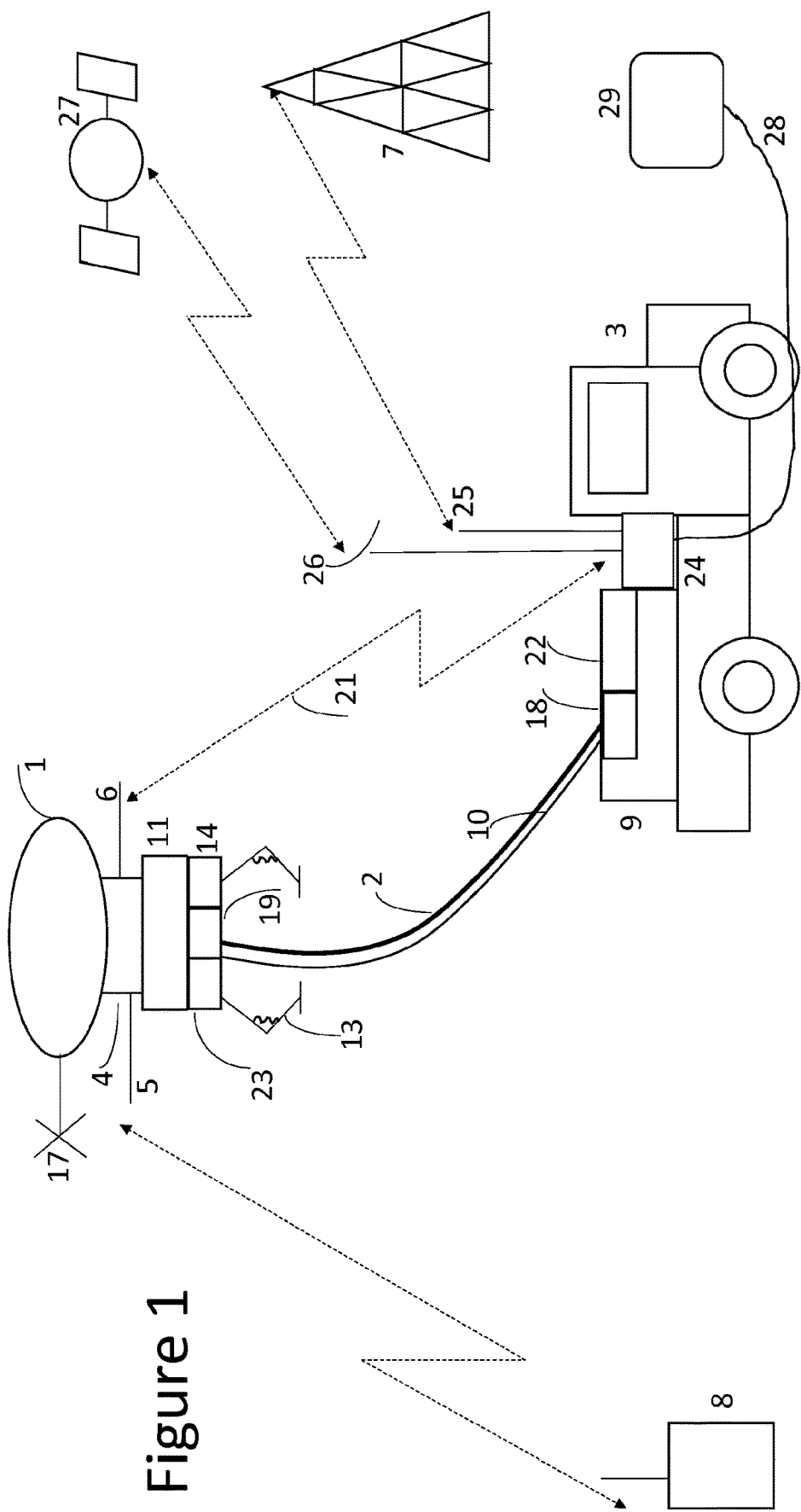
FIG. 1 is a schematic illustration of a system operating in accordance with the disclosure.

FIG. 1 depicts an airborne device 1 attached by a tether 2 to a mobile ground station 3 which may be mounted on a motor vehicle. The device 1 may be an unpowered aircraft such as a balloon or a powered device such as a "drone". Such tethered airborne devices have a number of applications such as for observation, surveying, etc., but in this example it carries communications equipment 4 and antennas 5, 6 for communicating respectively with user terminals 8, and with a base station 7, 27, 29 such as a mobile communications base station 7, a satellite 27, or an exchange 29 in a fixed network.

It can be advantageous to relay communications between the base stations 7, 27, 29 and the airborne communications equipment 4 by way of a communications modem 24 associated with the ground station 3. An in-band backhaul arrangement may be used in which a 3G/4G signal is received from an existing tower (7) by an antenna 25 on the mobile platform 3, or a satellite link 26, 27, or a wired link 28, 29 to a fixed exchange. The modem 24 converts that signal into Ethernet protocol and transmits it to the airborne equipment 4 using a short range wireless link 21 (as shown), or a wired link associated with the tether 2. The airborne equipment 4 then reconverts the signal to 3G/4G for wireless transmission to the User Equipment 8.

A power generator 9 is associated with the ground station 3 for delivering electrical power through a cable 10 associated with the tether 2 to a power management system 11, so that power can be delivered, both for the onboard communications equipment 4 and for propulsion and control systems 17 of the airborne device 1 used to maintain it airborne, hold position, and to control its orientation. Mechanical strain on an electrical cable could damage it, causing higher resistance resulting in over-heating of the cable, but for a tethered aircraft this can be avoided by having the weight of the electrical cable 10, and any mechanical tensions transmitted from the airborne craft, borne by a tether 2.

Figure 2:
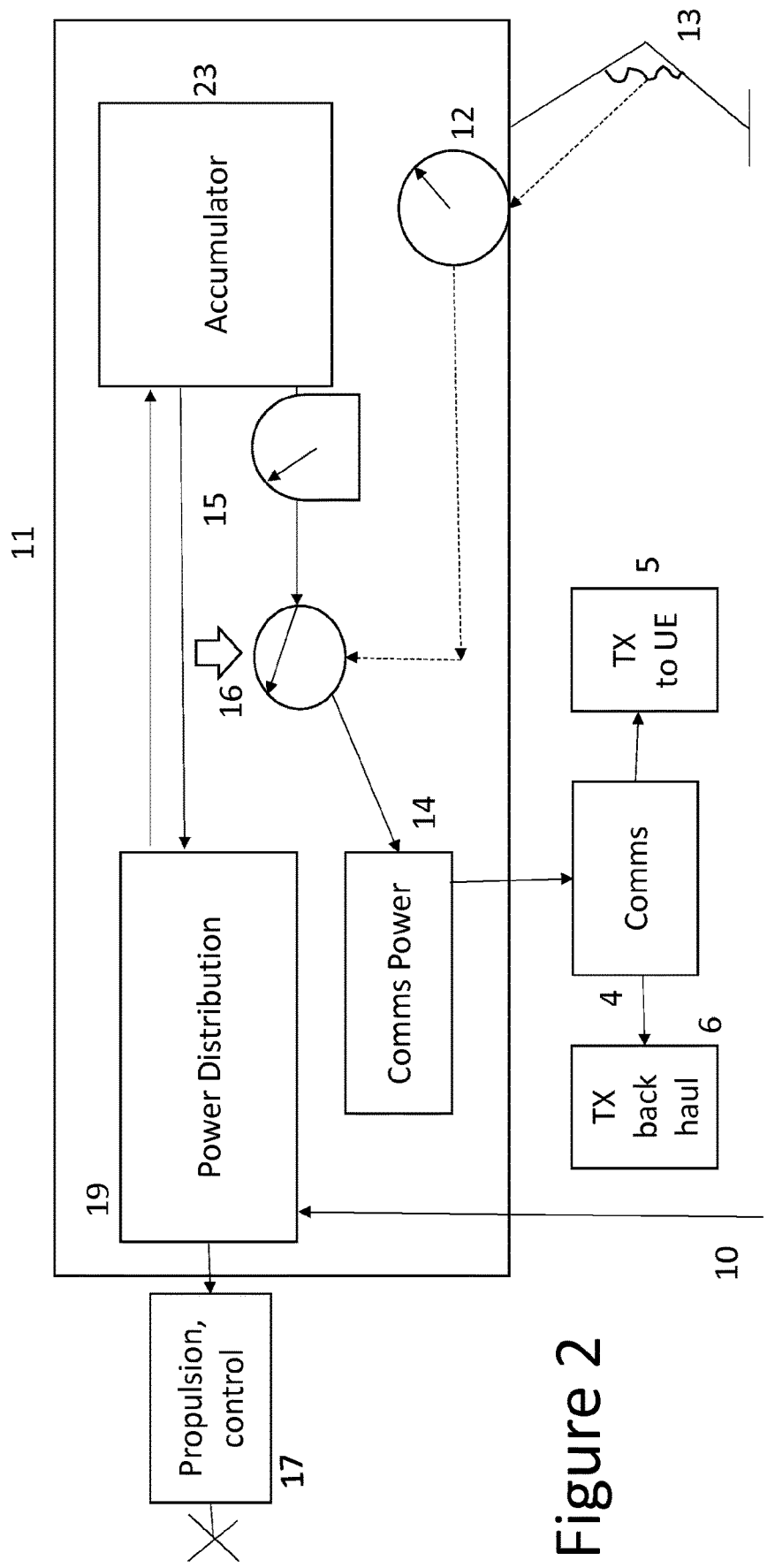
FIG. 2 is a more detailed schematic representation of the power management system of the system of FIG. 1.

The power management system 11 on board the airborne device 1 is depicted schematically in FIG. 2. In this embodiment, the power management system comprises a power distribution system 19 which is connected to a power supply 18 through a cable 10. The power distribution system 19 supplies electrical power to the propulsion and control systems (depicted generally at 17). An accumulator 23 is also provided, which takes charge from the power distribution system 19 and can be used, in the event of failure of the power supply 10, to deliver power to the propulsion and control system 17 to allow a controlled descent.

For reasons which will become apparent, it is desirable that control of the aircraft is done through a medium separate from the wireless communications relay system 4. Control may be a "fly-by-wire" system using the electrical cable 10, or an independent low-powered radio-frequency remote control system.

The wireless communications relay system 4, 5, 6 is powered through a separate power management system 14 which is not powered directly from the power distribution system 19 but instead takes its power from the accumulator 23. The power management system 11 is arranged such that until the aircraft is airborne, (specifically, when the propulsion and control system 17 is not taking power, and/or when no power is being delivered through the connection 10) the accumulator is not charged up, and thus unable to deliver power to the communications systems 4, 5, 6.

Figure 3:
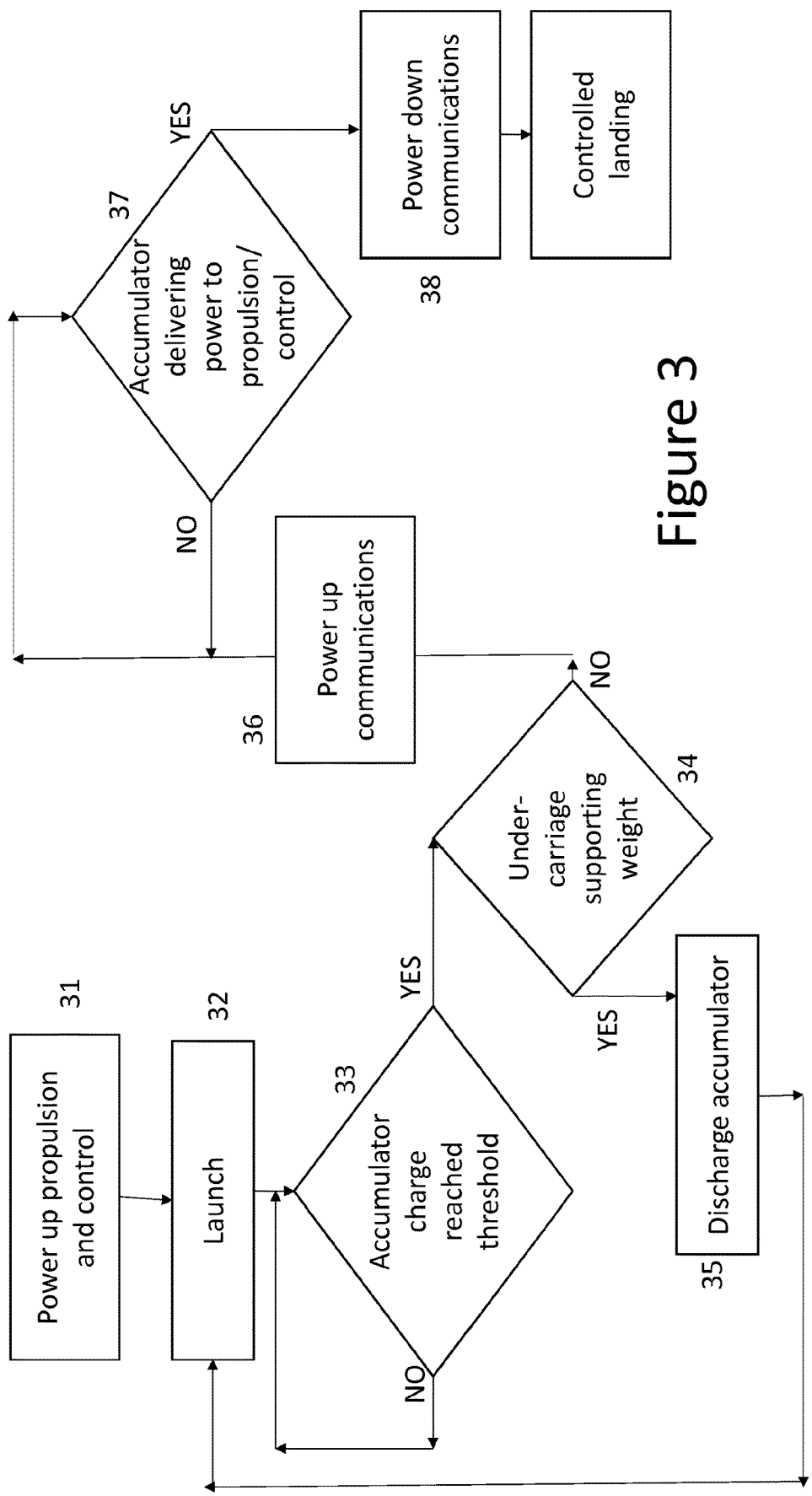
FIG. 3 is a flow diagram illustrating the power-up and power-down procedures for this embodiment.

The operation of the system will now be described with reference to FIG. 3. When the aircraft is first powered up (at 31) ready for launch (at 32), power is delivered to the power management system 19 to power the aircraft and begin to charge the accumulator 23. The accumulator has an associated charge monitoring system 15 which monitors the electrical charge in the accumulator and is arranged to deliver power to the communications power management system 14 (at 36) only when the charge in the accumulator has risen above a predetermined threshold (at 33), selected so that the aircraft will have gained sufficient altitude to have reached a distance from people and objects on the ground such that they are no longer within its exclusion zone. This allows the communications equipment 4, 5, 6 to be activated automatically after it has become airborne.

Arrangements may also be made to cease powering the communications equipment 4, 5, 6 when the aircraft is to be landed. In the event of a failure of the power supply 10, the accumulator 23 will begin to deliver power to the propulsion system 17 in order to manage a controlled descent and landing (at 39). Descent may be achieved by venting of flotation sacs in a lighter-than-air craft, or a low speed descent under power for a device in which lift is generated by powered means. The output of the accumulator 23 is provided with a relay 16 which is responsive to a power draw from the accumulator 23 from the flight power management system 19 (at 37) to cut the power supply to the communications system 14 (at 38). Therefore, in the event that the power supply 10 is lost, the communications equipment is also disabled, thus ensuring that personnel on the ground are not exposed to high levels of microwave radiation when the aircraft reaches the ground.

This landing procedure is particularly suitable for situations in which a loss of power is unplanned, as it automatically shuts down the communications system. However, it can also be used for a deliberate landing procedure. When it is desired to bring the craft down to land, a signal is sent to the craft which causes it to initiate a landing procedure. As part of that procedure, the flight power system 19 disconnects itself from the external power supply 10, and starts to draw power from the accumulator 23 (at 37). This causes the relay 16 to switch off power to the communications system 14 (at 38) whilst it is still airborne and objects on the ground are still outside the exclusion zone of the transmitters 5, 6. The accumulator 23 will continue to discharge until the aircraft lands. Consequently, the accumulator is at least partially discharged by the time it reaches the ground, reducing the risk of a flashover when the aircraft lands, and ensures that there cannot be an activation of the communications system 4, 5, 6 when on the ground. It also places the accumulator in the correct condition for the next launch.

Embodiments of the present disclosure may make use of any suitable power supply system. In one such power supply system, electrical power is supplied to the aircraft using a pulsed power supply system in which a generator 9 generates electrical power, which is delivered to a transmission unit 18 which transmits electrical power in pulses to the cable 10 for delivery to the power-receiving unit 19 which regulates the power for delivery to electrical equipment 11 in the airborne device 1. The system is arranged such that a pulse is only transmitted from the transmission unit 18 if the receiving unit 19 acknowledges the previous pulse, thus "failing safe" if the cable 10 is damaged.

The accumulator 23 can be used to smooth out the supply in a pulsed system. In such a case the relay 16 would be designed only to respond to a continuous current flow from the accumulator 23 to the flight power system 19, and not to intermittent smoothing pulses passing back and forth between them.

This embodiment uses the electric charge in the accumulator as the means of controlling when the communications system powers up, but other means may also be used to supplement this, such as a ground proximity radar, or a timing delay initiated at launch. Launch may be confirmed by sensors 12 monitoring whether an undercarriage component 13 is supporting the weight of the aircraft (at 34) and, if it is detected that the aircraft is still on the ground, restoring the accumulator to its pre-launch state (at 35).

The invention claimed is:

1. An unmanned aircraft comprising:
   an onboard applications equipment;
   an electrical power connection for receiving electrical power from a remote source; and
   a power delivery system for delivering electrical power to the onboard applications equipment, the power delivery system being arranged to start delivering power to the onboard applications system after the aircraft has left the ground, wherein the power delivery system comprises an electrical accumulator, the electrical accumulator being arranged to be charged from the electrical power connection during flight, and to deliver power to the onboard applications equipment when the charge in the electrical accumulator exceeds a predetermined threshold.

2. The aircraft according to claim 1, wherein the power delivery system is arranged such that the electrical accumulator delivers electrical power to the onboard applications equipment only when power is being delivered to the aircraft through the electrical power connection.

3. The aircraft according to claim 2, further comprising a flight control system which is configured to be powered from the electrical power connection when the electrical power connection is delivering electrical power, and to be powered from the electrical accumulator when the electrical power connection is not delivering electrical power, and configured to enter a controlled descent mode when powered from the electrical accumulator.

4. The aircraft according to claim 1, further comprising a power distribution system for receiving electrical power from the electrical power connection and transmitting the electrical power to the power delivery system and to a flight control system.

5. The aircraft according to claim 4, wherein the power delivery system is arranged such that the power delivery system delivers electrical power to the power distribution system to power the flight control system, and that the power delivery system is disconnected from the onboard applications system when the power delivery system is delivering power to the power distribution system.

6. The aircraft according to claim 4, wherein the power delivery system is arranged such that the power delivery system is disconnected from the onboard applications system when the electrical power connection is not receiving power from the remote source.

7. The aircraft according to claim 1, further comprising a ground proximity sensor, the power delivery system being controlled to shut off power to the onboard applications equipment when the ground proximity detector detects that the aircraft is within a predetermined distance from the ground.

8. The aircraft according to claim 1, the power delivery system being controlled by a weight sensor connected to a component of an undercarriage of the aircraft, the power delivery system being controlled to shut off power to the onboard applications equipment when the weight sensor detects that the undercarriage is supporting a weight of the aircraft.

9. A method of delivery of electrical power to applications equipment on board an unmanned aircraft, the aircraft having an electrical power connection for receiving electrical power from a remote source, comprising:
   launching the aircraft with the applications equipment disconnected from a power delivery system;
   detecting that the aircraft is airborne; and
   delivering power from the remote source to the accumulator through the electrical power connection when the aircraft is airborne, wherein the power delivery system is an accumulator, and the applications equipment is connected to take electrical power from the accumulator only when the accumulator has received a predetermined electrical charge.

10. The method according to claim 9, wherein if the aircraft stops receiving power from the remote source through the electrical power connection, the flight control system takes power from the accumulator to perform a controlled descent mode.

11. The method according to claim 9, wherein the applications system is shut down if electrical power is not being delivered to the accumulator.

12. The method according to claim 9, wherein during launch a flight control system is connected to and powered from the electrical power connection.

13. The method according to claim 9, wherein the applications equipment is equipped to operate as a wireless communications base station, and is configured to disable associated radio transmission equipment when the aircraft is within a predetermined distance from the ground or time after launch.

* * * * *